Aug. 30, 1955     R. W. HURSH     2,716,494
ROTARY TABLE FILTER

Filed June 25, 1953     4 Sheets-Sheet 1

INVENTOR
Robert W. Hursh,
BY Daniel E. Igo
ATTORNEY

Aug. 30, 1955 R. W. HURSH 2,716,494
ROTARY TABLE FILTER
Filed June 25, 1953 4 Sheets-Sheet 2

INVENTOR
Robert W. Hursh,
BY Daniel E. Ig
ATTORNEY

Aug. 30, 1955    R. W. HURSH    2,716,494
ROTARY TABLE FILTER
Filed June 25, 1953    4 Sheets-Sheet 3
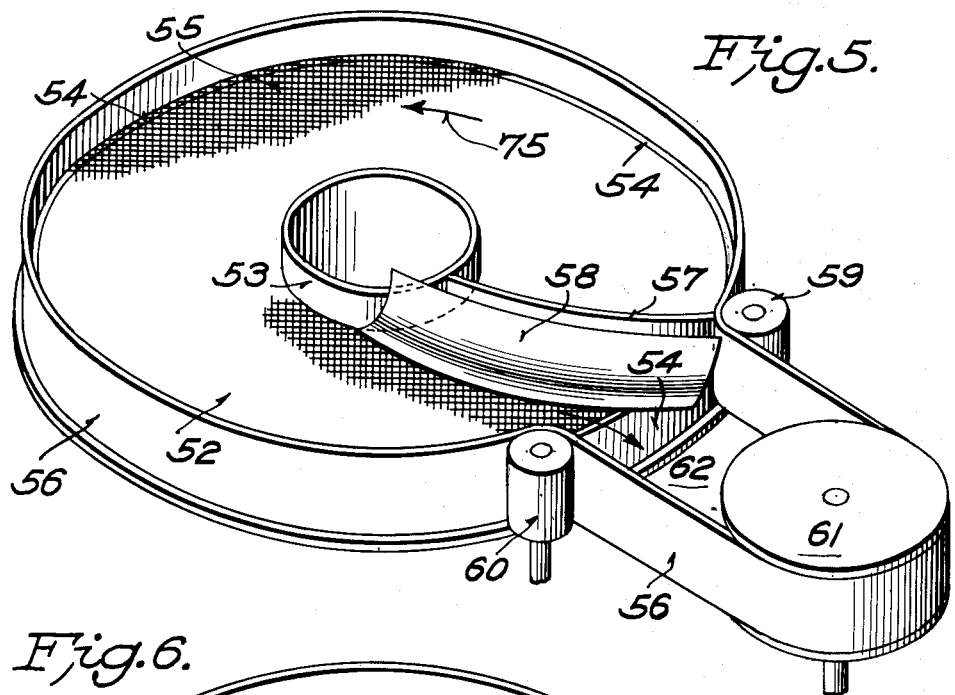
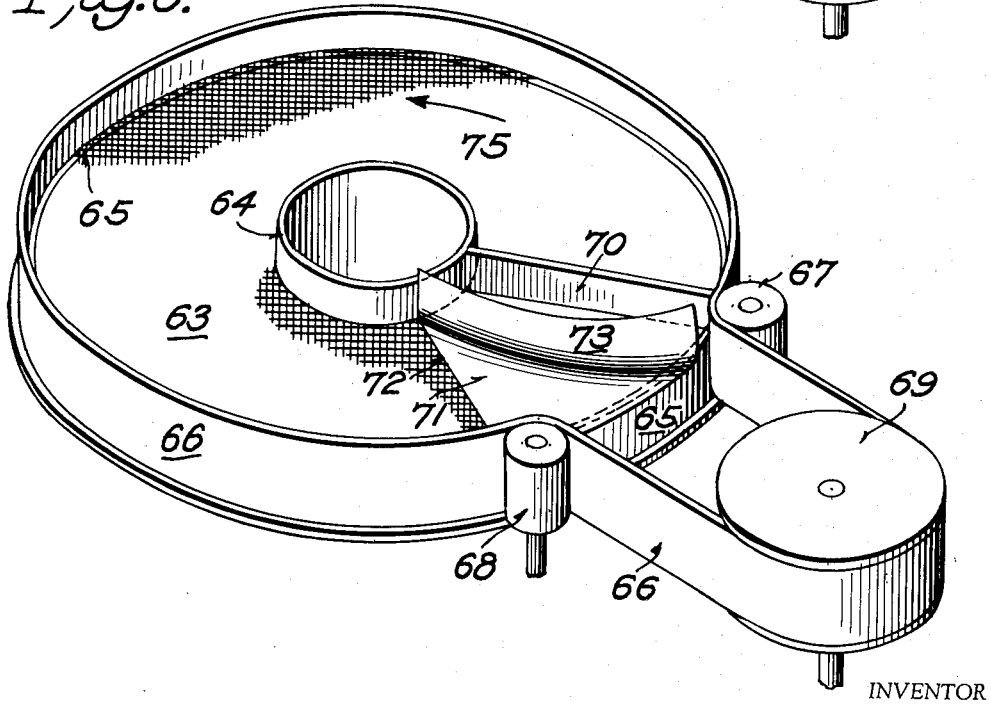
INVENTOR
ROBERT W. HURSH,
BY Daniel E. Igo
ATTORNEY Aug. 30, 1955 R. W. HURSH 2,716,494
ROTARY TABLE FILTER
Filed June 25, 1953 4 Sheets-Sheet 4

INVENTOR
Robert W. Hursh,
BY Daniel E. Ego
ATTORNEY

United States Patent Office 2,716,494
Patented Aug. 30, 1955

2,716,494
ROTARY TABLE FILTER

Robert W. Hursh, Coatesville, Pa., assignor to Lukens Steel Company, Coatesville, Pa., a corporation of Pennsylvania Application June 25, 1953, Serial No. 363,960

13 Claims. (Cl. 210—202.5)

This invention relates to a continuous table filter having an annular pan, and is particularly concerned with an improved filter of this general type but employing a novel table rim and material discharge means.

An object of the invention, therefore, is to provide a rotary vacuum filter having a novel means for horizontal discharge of the filtered material, and making it unnecessary to discharge the material from the draining screen in an upward direction.

Another object is to provide a filter having a novel means for rotating the annular pan of the filter, and specifically a novel pan rim which drives the filter about its geometrical axis.

Yet another object is to improve the means for diverting the filtered material following the filtering operation from the draining screen to its point of discharge.

An additional object is to provide a filter having a flexible belt driving means forming the table rim for driving the table, and forming the material confining means.

Another object is to provide a filter unit having an area adjacent the table rim forming a discharge station wherein the spent filtered material may be moved in a radial direction which is on a horizontal line from the table axis.

A further object of the invention is to provide novel means for maintaining proper tension on the belt which is used as the table driving and material confining means of the filter.

Another object is to provide a liquid sealing means between the rotary table of the filter and the belt drive therefor.

Finally, it is a further object of this invention to provide a filter unit having a filter bed periphery, a discharge station therebeside whereby the filtered material may be moved by plow means from the rotating bed in an unobstructed horizontal, radial plane to the discharge means, said plow means having the contour of a logarithmic spiral whereby the angle of contact of the material and plow means throughout the bed radius is substantially constant.

Other objects will appear hereinafter throughout the specification where the invention is described in connection with the several embodiments shown in the drawings, in which:

Figure 5 is a perspective diagrammatical view of a fourth form of the invention;

Figure 6 is a perspective diagrammatical view of a fifth form of the invention;

Figure 1:
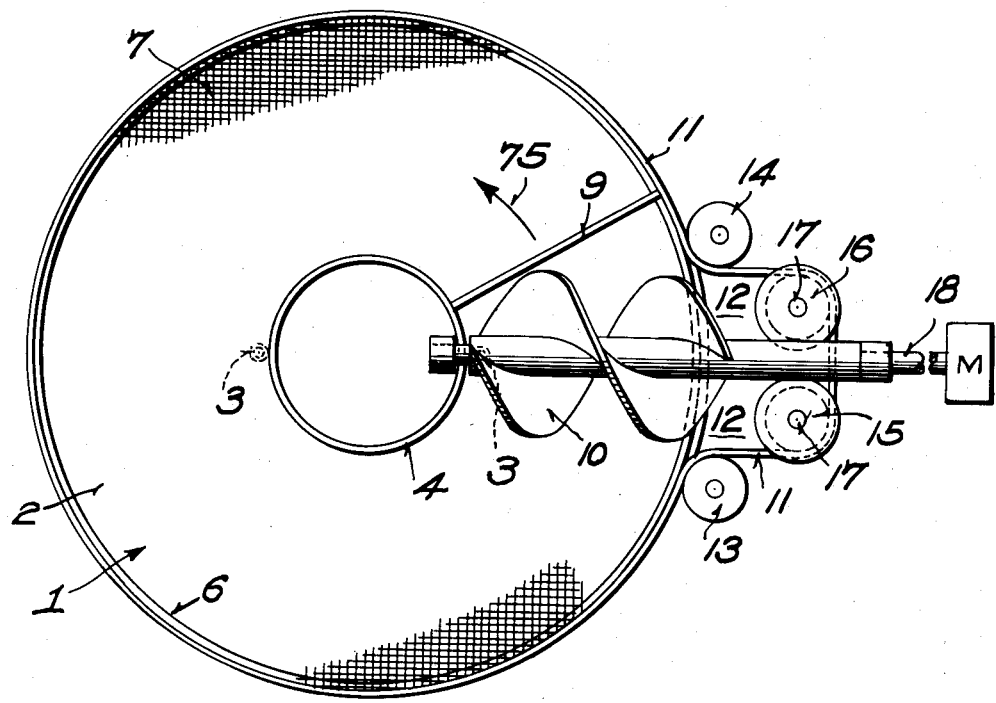
Figure 1 is a top plan diagrammatical view of a continuous vacuum filter table showing one form of the invention.

In general, the invention provides a combined table drive and filtered material discharge whereby the material after the filtering operation is discharged by mechanical means to a point of discharge without the necessity of raising the material over the outer rim that is secured to the bottom plate of the rotary table, the material being removed from the rotating screen in a radial, substantially straight unobstructed horizontal path by the scroll, or by the plow, several forms of which are shown in the drawings.

It will be understood that the usual mechanism for supporting the table and for feeding material to the table will be provided.

Figure 2:
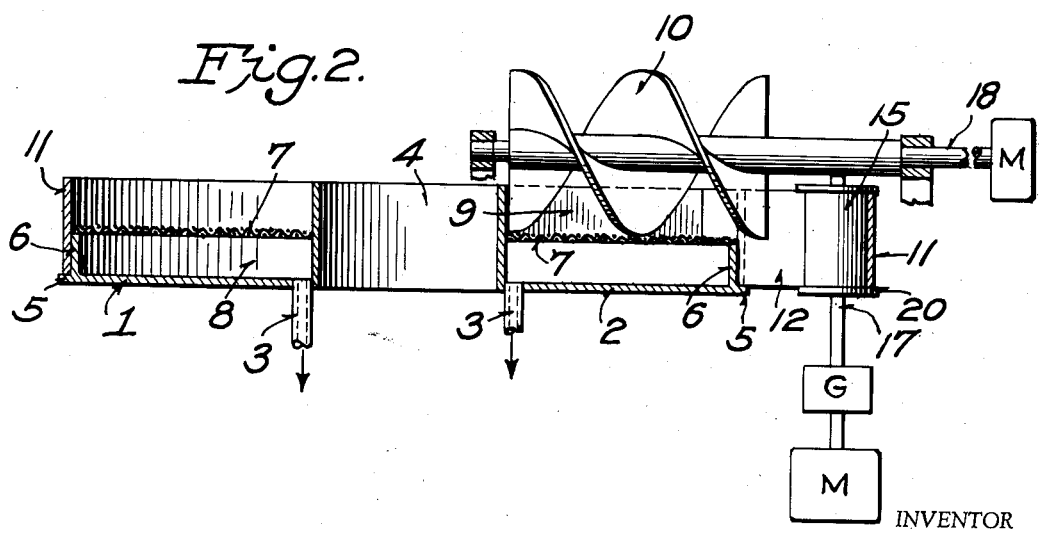
Figure 2 is a diagrammatical vertical sectional view partly in elevation of the filter shown in Figure 1.

Referring to Figures 1 and 2, the filter shown therein comprises an annular pan 1, having a plate 2 which is shown as slightly inclined away from its center and which is provided with the usual drain passageways 3. The pan has an inner upstanding rim or collar 4, an outer peripheral shoulder 5 and outer rim 6 forming the filter bed periphery, all of which are integral with the plate 2. Supported by the rings 4 and 6 by welding or other means is a filter medium or screen 7 providing a space 8 between the same and the inclined plate 2.

A suitable support (not shown) holds the stationary dam 9 in proper position between the inner and outer rings 4 and 6. Rotation of the annular pan 1 is preferably attained by a pulley and belt arrangement which consists of the endless belt 11 which engages for most of its travel, the outer shoulder 5 and ring 6. The dam 9 is positioned, as shown, adjacent the scroll 10 hereinafter to be described and on the leading side thereof with respect to normal rotation of the pan 1 as shown by the arrow 75 in Figure 1.

The belt 11 leaves the shoulder 5 and outer ring 6 on one side of the discharge station 12 and again engages this ring and shoulder on the opposite side of the said discharge station. This is accomplished by means of the guide pulleys 13 and 14 which engage the outer sides of the belt 11 and the drive pulleys 15 and 16 which engage the inner side. It will be understood that either one or both of the pulleys 15 and 16 may be driven by means of a shaft 17, letters M and G representing suitable drive means consisting of conventional motor means and gear units.

The scroll 10 is supported in suitable bearings and is driven by shaft 18. Pulleys 15 and 16 are each preferably provided with upper and lower rims 19 and 20, respectively.

The tension of the belt 11 may be made adjustable by adjusting the position of the shaft 17 of either of the pulleys 15 and 16, or adjusting the position of the pulleys 13 or 14, or both. It is necessary that tension be applied to the belt 11 in order that the same may tightly engage the shoulder 5 and outer ring 6 in order to prevent liquid from the material which rests on the screen 7 from leaking or finding its way between the belt and the outer collar 6 and shoulder 5.

Figure 8:
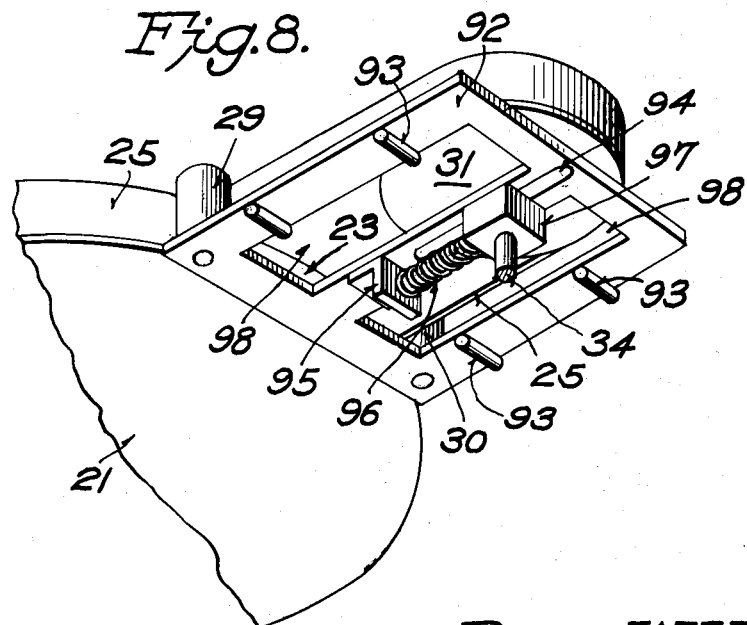
Figure 8 is a diagrammatic view of one form of maintaining proper tension of the belt or rim of the filter.

Moreover, the separate platform similar to the type shown in Figure 8 may be provided for mounting all of the pulleys 13 to 16 inclusive thereon, which platform may float toward and away from the axis of the annular pan 1 to thereby provide means for adjusting pulleys toward and away from the said axis to thereby adjust the tension of the belt 11 on the collar 6.

Maintaining proper tension on the belt is not only necessary to provide a seal but is essential for driving or rotating the pan 1. If required, additional means of the conventional type may be employed for driving or rotating the table 1.

Several types of belts may be employed, but preferably the belt consists of several plies of square woven fabric which has a cover of material resistant to the materials being processed in the filters, and such belts must have transverse rigidity. Transverse rigidity may be provided by placing a layer of low-stretch transverse cords on each side of the neutral axis, and for maximum rigidity, wire cord may be used. Tensile stress is resisted by a layer of low-stretch cords located near the neutral axis, extending longitudinally of the belt and in the portion thereof which contacts the rim 6. That portion of the belt which is located above the rim may consist of high-stretch material and this may be bias-cut square woven fabric, or a layer of high-stretch longitudinal cords, or straight-cut square woven fabric. Other belt material may include metal, and also unreinforced flexible plastics.

The forms shown in Figures 3, 4, 5 and 6 employ a pan, plate, passageways, outer shoulder, inner and outer collars and belt the same or similar to those shown in Figures 1 and 2, but the pulley and material moving or cake removing means varies in one or more of these figures, as well as the stationary dam in Figure 5.

Figure 3:
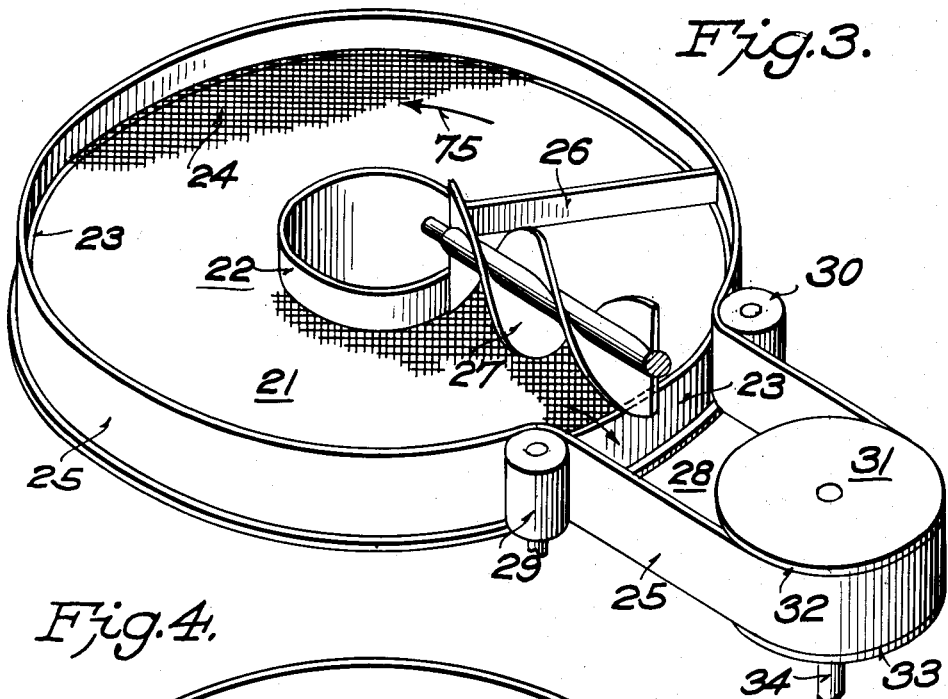
Figure 3 is a perspective diagrammatical view partly broken away of a second form of the invention.

Referring to Figure 3, the pan 21 has an inner rim 22, outer rim 23 forming the filter bed periphery, screen 24, belt 25, stationary dam 26, scroll 27 and discharge station 28, which parts are the same as those described and shown in Figures 1 and 2.

Instead of the four pulleys used, however, in Figure 1, two small pulleys 29 and 30 engage the outer side of belt 25 and a larger pulley 31 having upper and lower rims 32 and 33 take the place of pulleys 15 and 16. The pulley 31 may be driven by shaft 34 from a suitable source of power such as an electric motor and gear means as schematically shown in Figure 2. Shaft 34 may be mounted on an adjustable table as shown in Figure 8, whereby to adjust and maintain the tension of the belt 25, or one or both of the pulleys 29 and 30 may be adjustable, to independently adjust the tension on the belt.

Figure 4:
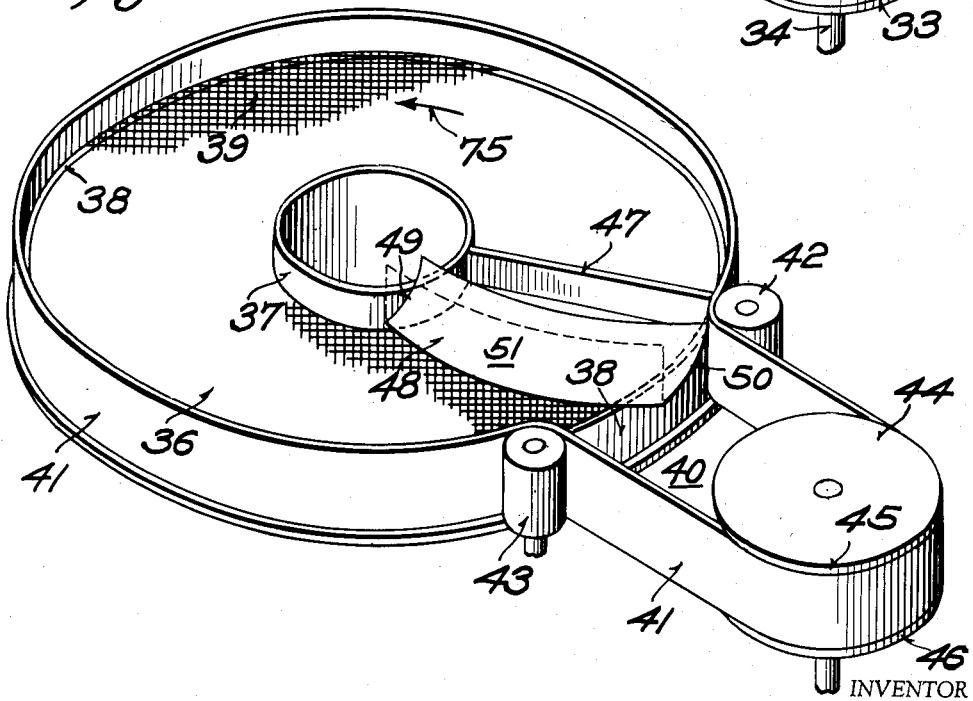
Figure 4 is a perspective diagrammatical view of a third embodiment of the invention.

The Figure 4 construction is identical with that of Figure 3 and similar to the structure of the other figures. In the Figure 4 construction, however, the scroll has been dispensed with and a plow substituted therefor. In Figure 4, the pan 36 has an inner rim 37, outer rim 38 forming the filter bed periphery, screen 39, discharge station 40, belt 41, a pair of external belt pulleys 42 and 43 and an internal belt pulley 44 having rims 45 and 46, and a stationary dam 47. Also stationarily mounted as shown in the figure is a plow 48. One end 49 of the plow is located adjacent the inner rim 37 and the opposite end 50 rests upon and extends over, the outer rim 38. This end terminates adjacent to that portion of the belt which passes over pulley 42.

The forward face 51 of plow 48 engages the cake material as it is presented by the rotating screen. This face is in the shape of a logarithmic spiral, in that it presents a constant angle at all radii, such as $r$ or $r'$ in Figure 7, between the plow and the direction of travel of the material approaching the plow. This plow face is slightly concave in vertical cross section, at all radial distances from the geometric center of the rotating filter, the theoretical explanation of which will be discussed hereinafter.

The structure shown in Figure 5 corresponds to the structures of the previously described figures, particularly Figures 3 and 4, except that a different type of dam is provided in the structure shown in Figure 5. In this figure, 52 is the pan. This pan is provided with the usual inner rim 53, outer rim 54 forming the filter bed periphery, screen 55, belt 56, stationary dam 57, plow 58, external belt-engaging pulleys 59 and 60, internal pulley 61 and discharge station 62. Stationary plow 58 is of the same shape and has the same location as plow 48 of Figure 4. However, the stationary dam 57 is curved in the same outline as the plow 58 in order to conserve filtration area.

Figure 6 shows a pan and pan drive means which may be the same as the structure shown in Figure 5. However, a different type of plow is employed in the Figure 6 construction. The dam, while similar to the dam shown in Figure 1, may, instead, be similar to the dam 57 of Figure 5 in that it may be of a curvature corresponding to the curvature of the material moving face or rear portion of the plow. In Figure 6, 63 is the pan having an inner rim 64, outer rim 65, belt 66, pulleys 67, 68, 69, dam 70 and plow 71. The plow has a leading edge 72 which is a substantial radius of the filter bed and which presents a greater angle to the direction of travel of the material as it moves toward the discharge station, than does the trailing upstanding portion 73. This latter is curved to the form of a logarithmic spiral, wherein at any radius $r$, the surface presented to the moving material forms with said material an angle of presentation which does not vary, as explained further hereinafter.

The purpose of the several dams shown in this and other figures is to prevent back flow of slurry as it is fed by the usual feed means (not shown) onto the screen. Such back flow of slurry would ordinarily find its way into the discharge area including the discharge station, such as station 62, unless the dam was provided, even though the filter is continuously rotating as shown by the arrows in the several figures in a counter-clockwise direction.

In connection with supporting stationary plows 51, 58 and 73 and scrolls 10 and 27, which are rotatably supported, any suitable type of frame extending over the filter unit may be provided, said frame having the usual brackets and slotted holes for permitting vertical and horizontal adjustment of the plow and/or scroll.

Figure 7:
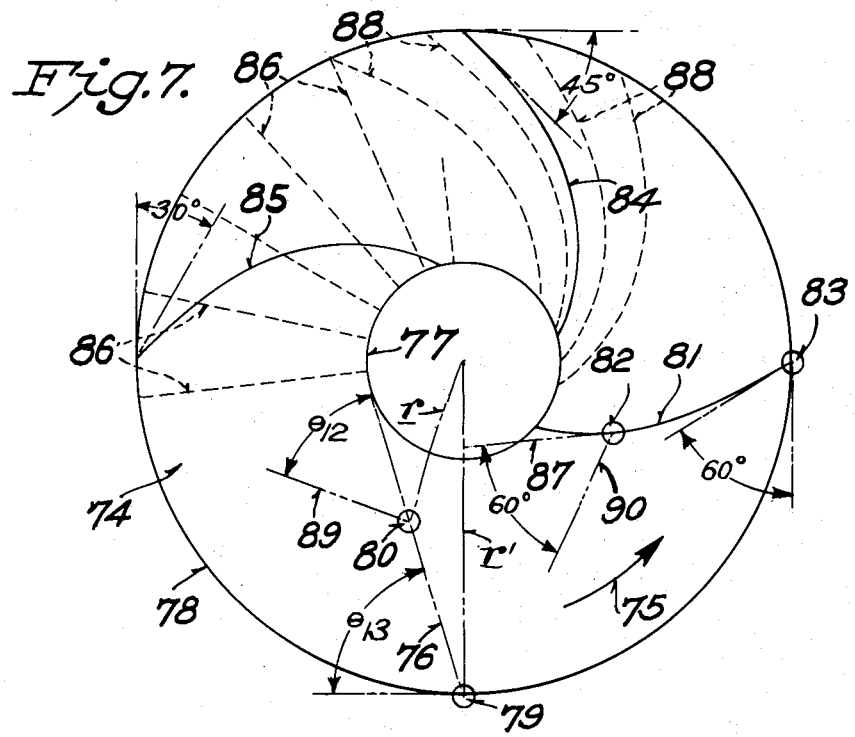
Figure 7 represents a rotary table and the several angles for discharge of material from the table, and also showing in dotted lines, radial division plates and plates corresponding to plow contour.

Figure 7 shows a schematic top plan view of a rotary filter provided with a plow shaped according to the present invention. The rotating table or filter is indicated by the reference numeral 74, the rotation of which preferably is in a clockwise direction as shown by the arrow 75, as in all other of the figures herein. Should a plow of conventional design be used, such as shown at 76 wherein the plow extends in a straight line from the rim 77 to the rim 78, point 79 at the outer diameter is down stream from point 80, which latter is closer to the inner diameter than point 79. Material whose travel is tangent to a circle at any point, such as a circle having radius $r$, will be forced toward the outer edge of the table by the plow, indicated schematically at 76. The more nearly the material engaging portion of the plow approaches that of a tangent rather than the radius of a circle at any given point, the greater will be the tendency to discharge the material from the filter bed.

The angle formed between any straight line 76 and line 89 varies with the length of radius $r$ which is a typical selected distance from the center of rim 77 to any point 80 of location of material during travel. This angle $\theta_{12}$ is defined by the line 76 which is tangent to circle 77 and the line 89 which is at right angles to radius $r$ and intersects line 76 at point 80. $\theta_{13}$ represents another typical example and specifically the maximum angle possible at the outer radius $r'$, i. e., for a filter having inner and outer peripheries, or rims of the particular ratio shown.

To produce a uniform tendency for the discharge of material at all radii rather than non-uniform discharge, as is the case wherein the angle between material travel and the plow varies with the radius as illustrated by the difference in magnitude between angles $\theta_{12}$ and $\theta_{13}$, it is preferred to provide a constant angle of plow to the travel direction of the approaching material. A plow having a curvature represented by 81, which is a logarithmic spiral, will cause the material to be discharged uniformly at all radii as the material approaches the plow.

At any radius such as $r$ or $r'$, the angle between a tangent 90 to the circle of that radius and a line 87 which is tangent to the plow contour 81 at the point 82 is constant at, for example, 60° as shown a points 82 and 83. The smaller this constant angle, the greater is the tendency to move material outward from the center of circle 77. Examples of additional logarithmic spirals are shown by lines 84 and 85, respectively where the constant angles are substantially 45° and 30°, respectively.

From the above, it can be seen that with circles of the proportion of 77 and 78, the angle $\theta_{13}$ in connection with a straight line plow 76 is limited to a minimum value which means that as the material makes contact with the plow, the resultant force is resolved into two components, one of which is normal to the plow face and the other tangent thereto. It is this tangent component which produces the force for discharge and hence the smaller the angle of contact, such as $\theta_{12}$ or $\theta_{13}$, the greater the constant discharge unit force. With the use of the spiral shapes or contour for the plow, smaller angles of contact are possible.

Geneally speaking, the pan of the filter table is divided into a number of compartments by radial division strips 86 as shown in dotted lines in Figure 7, in order to provide compartments. The line 85 represents the plan contour of a spiral plow. Since it is desirable to release the vacuum beneath the screen which supports the material during the discharge of said material, it will be understood that the portion of filter area occupied by several compartments between the radial division strips over which the plow contour extends (such as four or five of a total of twenty compartments), are not available for vacuum filtration.

As also seen in Figure 7, the broken lines 88 represent a few compartment division strips which have been shaped similarly in plan to the plow contour 84. In this somewhat theoretical application of the principles above enunciated, only one compartment between adjacent lines 88 is unavailable for filtering, and all of the others, due to the structural arrangement, will be available for filtering where the plow and compartments are arranged in logarithmic spirals as indicated in Figure 7. Of course, the spiral division strips are preferably used only in connection with a plow or discharge means having a shape of a logarithmic spiral, and it can be seen that by having the vacuum sections of the filter of a contour which in plan conforms to the shape of the plow, the maximum portion of the table area is available for vacuum filtration.

Referring to Figure 8, there is shown a suitable arrangement for adjusting and maintaining the desired tension on, for example, belt 25, so that a sufficient seal against liquid leakage will be maintained between the belt 25 and the outer rim 23 and result in the belt causing the pan 21 to rotate. Numeral 92 represents a frame mounted for movement or adjustment on rollers 93, said frame being of rectangular shape and having a plurality of openings as shown, said rollers being adapted for movement in guides or ways, not shown, and thereby restrained from rotation. Pulleys 29 and 30 are rotatably mounted on the frame 92 in conventional manner and extending through the slot 94 is shaft 34 which supports and drives pulley 31. Actually, with the use of the structure shown, the shaft 34 may be connected through universal joints (not shown) to the drive means to permit vibration and slight movement of pulley 31 with respect to the fixed drive shaft or the drive means may be mounted on the frame 92 so that it is free to slide in accordance with the position of shaft 34. Attached to the frame 92 is an angle bracket 95 to which is mounted one end of a compression spring 96, the other end being secured to a block 97 affixed to shaft 34. The openings 98 are provided for discharge purposes and it is to be understood that frame 92 is independent of and slidable or movable on, by means of the rollers 92, the frame (not shown) of pan 21.

It is to be understood that other types of means for applying belt tension and providing a seal in connection with all forms of the device that are shown are intended to come within the scope of this invention. As a matter of fact, it would be preferred to eliminate the dividing partition of the frame 92 and place two springs 96 and brackets 95 at the underside of the side edges of the frame or to locate a single tension spring radially outward from the discharge area whereby there would be no interference with the discharge from the filter bed.

The arrangement shown in Figure 8 operates as follows: spring 96 forces shaft 34, together with pulley 31, radially outward and it also forces platform 92 in an opposite radial direction, namely radially inward. The latter action also forces pulleys 29 and 30 radially inward, and this results in the belt 25 being kept in close contact with table 21 where it passes around pulleys 29 and 30. Therefore, not only is the tension of the belt 25 maintained, but the belt 25, which provides the principal rim of the filter, is maintained in sealed contact with the filter table or rim part 23 throughout the peripheral portion of the latter except at the formation of and throughout the rim area that forms a part of the discharge station 28.

The above description and drawings disclose several embodiments of the invention, as specific language has been employed in describing the several figures. It will, nevertheless, be understood that no limitations of the scope of the invention are thereby contemplated, and that various alterations and modifications may be made such as would occur to one skilled in the art to which the invention relates. For example, it is within the purview of this invention to provide more than one discharge station for each unit.

I claim:

1. Apparatus for removing solid filtered material from a relative flat horizontal filter comprising a horizontally disposed rotary filter bed having a peripheral portion, said bed being adapted to receive a layer of solid material thereon, a discharge station located adjacent the periphery of the filter bed, and material removing means extending across said bed and adjacent to said discharge station whereby to move said material in a horizontal direction toward said discharge station, said bed and peripheral portion forming an unobstructed horizontal passageway for the material moved by said removing means from said bed to said discharge station, said material removing means comprising a plow, said plow having means for moving material across said bed at a constant force at all radii of the bed and comprising a material moving surface, the contour of which is a spiral, and means to rotate said bed, said means comprising at least one pulley mounted adjacent said discharge station and spaced from said bed, guide means mounted adjacent each side of said discharge opening, an endless belt trained around the periphery of said bed and said pulley and between said edge and said guide means, said belt extending above the upper surface of said bed to form a wall around that portion of said bed engaged by said belt, and means to drive said pulley.

2. Apparatus as defined in claim 1, wherein said guide means each comprises a pulley.

3. Apparatus as defined in claim 1, wherein a means is provided to vary the tension on said belt.

4. A filter comprising a relatively flat circular and rotatable screen, said screen being substantially horizontally disposed and adapted to receive filter cake thereon, circumferentially spaced guide means mounted immediately adjacent the edge of said screen, a pulley spaced radially from the edge of said screen and adjacent said guide means, an endless belt trained around the edge of said screen and said pulley and between said edge and said guide means to form a discharge opening between said edge and said pulley, said belt projecting above the upper surface of said screen to form a wall around that portion of said screen engaged by said belt, means to rotate said pulley, and means to remove filter cake from said screen through said discharge opening, said belt tightly engaging said edge to form a seal between said belt and said edge where they contact each other.

5. Apparatus as defined in claim 4, wherein said last mentioned means is positioned directly above and in proximity to said screen.

6. Apparatus as defined in claim 4, wherein each of said guide means is a pulley.

7. Apparatus as defined in claim 4, wherein said last mentioned means is a scroll.

8. Apparatus as defined in claim 4, wherein said last mentioned means is a plow having a cake-engaging face the curvature of which is a logarithmic spiral.

9. Apparatus as defined in claim 6, wherein a dam is provided directly above said screen and immediately adjacent the plow, said dam having the same curvature configuration as said plow.

10. Apparatus as defined in claim 4, wherein a means is provided to vary the tension on said belt.

11. Apparatus for removing solid filtered material from a relatively flat horizontal filter comprising a horizontally disposed rotary filter bed having a peripheral portion, said bed being adapted to receive a layer of solid material thereon, a discharge station located below and adjacent the periphery of the filter bed, and material removing means extending across said bed and adjacent to said discharge station whereby to move said material in a radial direction toward said discharge station, said bed and peripheral portion forming an unobstructed horizontal passageway for the material moved by said removing means from said bed to said discharge station, said material removing means comprising a plow, said plow having means for moving material across said bed at a constant force at all radii of the bed and comprising a material moving surface, the curvature of which is a logarithmic spiral, and means to rotate said bed, said means comprising at least one pulley mounted adjacent said discharge station and spaced from said bed, guide means mounted adjacent each side of said discharge opening, an endless belt trained around the periphery of said bed and said pulley and between said edge and said guide means, said belt extending above the upper surface of said bed to form a wall around that portion of said bed engaged by said belt, and means to drive said pulley.

12. Apparatus as defined in claim 11, wherein the filter bed is partitioned into segments substantially conforming to the contour of the plow.

13. Apparatus for removing solid filtered material from a relatively flat horizontal filter comprising a horizontally disposed rotary filter bed having a peripheral portion, said bed being adapted to receive a layer of solid material thereon, a discharge station located adjacent the periphery of the filter bed, material removing means extending across said bed and adjacent to said discharge station whereby to move said material in a horizontal direction toward said discharge station, said bed and peripheral portion forming an unobstructed horizontal passageway for the material moved by said removing means from said bed to said discharge station, said material removing means comprising a plow, said plow having means for moving material across said bed at a constant force at all radii of said bed, comprising a material moving surface, the curvature of which is a logarithmic spiral whereby all angles from any radius between said plow and the direction of material approaching said plow are equal, stationary dam means lying adjacent to said plow and having a curvature corresponding to the material moving means of said plow, and means to rotate said bed, said means comprising at least one pulley mounted adjacent said discharge station and spaced from said bed, guide means mounted adjacent said discharge station and immediately adjacent said bed, an endless belt trained around the periphery of said bed and said pulley and between said guide means and said bed, said belt extending above the upper face of said bed to form a wall around that portion of said bed engaged by said belt, and means to drive said pulley.

References Cited in the file of this patent

UNITED STATES PATENTS

| | | |
|---|---|---|
| 1,830,516 | Kurie, Jr. et al. | Nov. 3, 1931 |
| 2,042,308 | Hardy | May 26, 1936 |
| 2,588,912 | Denhard | Mar. 11, 1952 |
| 2,636,612 | Cording, Jr. et al. | Apr. 28, 1953 |

FOREIGN PATENTS

| | | |
|---|---|---|
| 681,239 | Great Britain | Oct. 22, 1952 |